(12) United States Patent
Engel et al.

(10) Patent No.: US 9,218,582 B2
(45) Date of Patent: Dec. 22, 2015

(54) QUANTIFYING THE QUALITY OF TREND LINES

(71) Applicant: International Business Machines Corporation, Armonk, NY (US)

(72) Inventors: Carl Engel, Pendergrass, GA (US); Wesley M. Gifford, New Canaan, CT (US); Craig A. Rahenkamp, Niwot, CO (US); Krishna Ratakonda, Yorktown Heights, NY (US); Nianjun Zhou, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 13/761,639

(22) Filed: Feb. 7, 2013

(65) Prior Publication Data

US 2014/0222488 A1    Aug. 7, 2014

(51) Int. Cl.
*G06Q 10/06*    (2012.01)

(52) U.S. Cl.
CPC ...... *G06Q 10/06313* (2013.01); *G06Q 10/0631* (2013.01)

(58) Field of Classification Search
CPC .................................................. G06Q 10/0631
USPC ................................................ 705/7.11–7.42
See application file for complete search history.

(56) References Cited

U.S. PATENT DOCUMENTS

| 7,328,202 | B2 | 2/2008 | Huang et al. | |
| 2002/0049621 | A1* | 4/2002 | Bruce | 705/7 |
| 2002/0073100 | A1 | 6/2002 | Buchner | |
| 2003/0018952 | A1 | 1/2003 | Roetzheim | |
| 2008/0312980 | A1* | 12/2008 | Boulineau et al. | 705/7 |
| 2009/0006156 | A1* | 1/2009 | Hunt et al. | 705/7 |
| 2009/0018886 | A1 | 1/2009 | Lacy et al. | |
| 2009/0106060 | A1* | 4/2009 | Loewendahl | 705/7 |
| 2009/0265199 | A1* | 10/2009 | Moerdler et al. | 705/7 |
| 2010/0131314 | A1* | 5/2010 | Lo Yuk Ting et al. | 705/7 |
| 2011/0270647 | A1* | 11/2011 | Huang et al. | 705/7.28 |

OTHER PUBLICATIONS

Function Point. Wikipedia. http://en.wikipedia.org/wiki/Function_point downloaded Feb. 7, 2013.
International Function Point Users Group. http://www.ifpug.org/ posted Feb. 5, 2013.

* cited by examiner

*Primary Examiner* — Sujay Koneru
(74) *Attorney, Agent, or Firm* — Ryan, Mason & Lewis, LLP (57) ABSTRACT

Techniques for quantifying the quality of trend lines. A method includes defining a collection of reference data sets derived from multiple historical projects in a similar subject area as the target project, defining one or more indicators of data set applicability to a target project estimation, said defining based on multiple characteristics of the target project, evaluating applicability of each of the reference data sets based on the one or more indicators, and identifying one or more of the reference data sets as applicable for use in the target project estimation.

14 Claims, 3 Drawing Sheets

QUANTIFYING THE QUALITY OF TREND LINES

FIELD OF THE INVENTION

Embodiments of the invention generally relate to information technology, and, more particularly, to service project estimation.

BACKGROUND

In carrying out estimations for service projects (including physical projects such as manufacturing, construction, electronics, software development or services development), there is a need for creating a baseline (or multiple baselines). This baseline typically includes a set of historical projects and is used for future project prediction or estimation. Consequently, successful estimation relies on the accurate selection of proper candidate projects forming such a baseline set. One of the key characteristics of such a set of projects is that they come from a same or similar stochastic sample space with the same development and project execution environments. Furthermore, each sample project has to have reliable data quality.

Many projects face problems in development due to a lack of accurate estimation. Existing approaches commonly use a top-down approach to estimation using trend lines developed from a set of historical projects. However, these trend lines typically have been pre-determined from data that possess intrinsic uncertainty. Accordingly, existing approaches face challenges in that an estimation resulting from such techniques has a high degree of uncertainty.

Such uncertainty in project estimates can lead to potential business problems such as: 1) an overbid scenario where the estimate is too high and ultimately leads to the bidding enterprise losing a potential opportunity, and 2) an underbid scenario where the estimate is too low; the bid is won, but costs to complete the project cause a failure to meet gross profit targets, leading to a financially troubled project. Accordingly, a need exists for techniques to properly and accurate align a target project with an estimation model.

SUMMARY

In one aspect of the present invention, techniques for quantifying the quality of trend lines are provided. An exemplary computer-implemented method for evaluating applicability of a data set for a given target project estimation can include steps of defining a collection of reference data sets derived from multiple historical projects in a similar subject area as the target project, defining one or more indicators of data set applicability to a target project estimation, said defining based on multiple characteristics of the target project, evaluating applicability of each of the reference data sets based on the one or more indicators, and identifying one or more of the reference data sets as applicable for use in the target project estimation.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes quantifying the quality of trend lines. At least one embodiment of the invention includes building or generating multiple sets of indicators to quantify the quality of a reference data set and its applicability to a specific project for estimation. One such set of indictors can mark the quality from multiple perspectives. Another such set of indictors can justify the applicability and/or relevance of a trend line to a given project.

As detailed herein, aspects of the invention include assessing the quality of trend lines, determining if a given trend line can provide a more accurate estimate than other trend lines, and identifying and/or selecting the most suitable trend line from a set of candidates for use in connection with a specific target project. While specific examples are used herein for purposes of illustration, it is to be appreciated that embodiments of the invention are applicable to a variety of situations where estimates are formed based on historical data and known aspects of the project for which the estimate or predication is needed.

Accordingly, in at least one embodiment of the invention, input is obtained from an estimator component and/or subject matter expert (SME) and used to define indicators of trend line (or base set) quality. Such input can take into account any special and/or important aspects of the particular domain in question for the target project. Additionally, a metric can be defined in connection with the indicators, wherein the metric captures the overall quality of a trend line. By way of example, such a metric can include a simple average of separate individual metrics, or the metric can include a more complicated function of separate individual metrics which is determined through an optimization procedure. Further, a subset of the available projects is ultimately selected, the corresponding metrics evaluated and the quality of the associated trend lines are reported to the user. In at least one embodiment of the invention, selection (and display) of identified candidate trend lines can include a depiction of the uncertainty/risk pertaining to each trend line along with a visual (for instance, color-coding) approach. For example, each indicator can include a positive numerical number that can be mapped to a color-coded signal (such as, for example, the colors corresponding to a traditional traffic signal).

In at least one embodiment of the invention, a first indicator represents coherence of project environment variables in an historical data set. The degree of coherence reflects how accurately a set of harvested projects can be categorized into the same statistic sample, therefore indicating that the trend line generated can be used for projects that fall into this category. Such an indicator is created based on target project environment variables such as, for example, industry, country, and primary language, as well as variables for estimation (for example, size, effort, and duration). Details regarding computation of this indicator include the following.

By way of example, consider a set of projects using global resources for solution delivery (GD) from a specific global country (for example, India) versus a non-specific set of GD projects. This first indicator functions by considering the following equation:

$$x_1 = \frac{1}{\ln\left[\prod_{i=1}^{M} N_i\right]} \sum_{i=1}^{M} e_i,$$

where summation and product is taken over i=1, ..., M environmental variables. The quantity $e_i$ is the entropy of a given environment variable distribution based on the probability distribution of possible choices for a given environmental variable, and $N_i$ is the number of possible choices for a particular environmental variable. For example, if GD country is an environmental variable, one example might include three choices: India, China and Brazil. In this instance, $N_1=3$, and the maximum entropy is ln 3. Additionally, if there are 50 projects from India, another 50 projects from China, and zero projects from Brazil, then $e_1=\ln 2$. The value of $x_i$ will be found after completing all of the environmental variables.

In at least one embodiment of the invention, a second indicator represents the degree of evenness of the project size distribution. Ideally, project sizes for a given historical data set are to be evenly distributed across a size range of interest. Considering this target, at least one embodiment of the invention includes comparing the evenness of the project sizes in a data set. One of way of measuring such evenness includes calculating the entropy of the size distribution and comparing it with the entropy for a uniform distribution. Details regarding computation of this indicator include the following.

By way of example, let x denote the logarithmic value (base 10) of the project size s, and k as the index of the projects of data set; then $$x_k = \log_{10} s_k$$

Further, define $$x_{max} = \max \{x_i | i \in [1, \ldots, K]\} \text{ and } x_{min} = \min \{x_i | i \in [1, \ldots, K]\}.$$

Here, K is the total number of projects. Accordingly, the evenness can be measured using:

$$x_2 = \frac{x_{max} - x_{min}}{x_{max} - x_{min}}.$$

Also entropy can be used to measure the evenness. Accordingly, separate all of the k projects into N distinct project size bins: The bin size is given by:

$$b = \frac{x_{max} - x_{min}}{N}.$$

Additionally, the frequency of each size bin can be computed as the fraction of projects that fall into that bin:

$$f_i = \frac{K_i}{K},$$

with $K_i$ as the total number of projects in a specific bin. Accordingly, evenness can be computed by comparing the entropy of the size distribution (bin frequencies) normalized by the maximum entropy (ln N):

$$x_2 = \frac{-\sum_{i=1}^{N} \ln f_i}{\ln N}.$$

It should be appreciated that the above is one example technique of estimating the entropy of size distribution, and several other methods are also possible in connection with one or more embodiments of the invention.

Also, in at least one embodiment of the invention, a third indicator represents a degree of variation or uncertainty. If a resulting trend line has a high degree of uncertainty, the resulting estimates will likely be inaccurate. As such, this indicator quantifies the degree of uncertainty for a given trend line and indicates if the level of uncertainty is at such a level that will guarantee adequate accuracy in the resulting estimation. Acceptable levels of uncertainty can be set by SMEs and/or based on historical analysis of trend lines. Details regarding computation of this indicator include the following.

The degree of variation of the trend line can be computed by considering the $R^2$ value, which effectively quantifies the fraction of the variation in the data that is accounted for by a predictive model (that is, the trend line). Another possible measure is the standard error of the estimate, which quantifies the variation in the residuals:

$$SeY = \sqrt{\frac{1}{K}\sum_{i=1}^{K}(\hat{y}^2 - y_i)^2}$$

This number can subsequently be compared with other values from industry-accepted trend lines. Additionally, a larger SeY would indicate a higher level of uncertainty and produce a lower indicator value.

Further, in at least one embodiment of the invention, a fourth indicator represents sufficiency of the number of projects. Such an indicator illustrates the reliability of the trend line based on the number of applicable projects in the associated historical data set. As is common in many industry settings, estimation practitioners may have recommendations or requirements pertaining to the number of projects that need to be included in a data set to yield satisfactory estimates. This indicator examines the number of projects in a current data set and compares that number to a target or threshold number. Such a target or threshold number can be pre-determined by an SME. For example, assume that a minimum number of 100 projects needed to achieve an acceptable quality data set; a number of 500 projects in the same statistical data sample space can achieve a good quality data set for a trend line.

By way of example, assume that the ideal number of projects is given by $N_{upper}$ (for example, 500), and the absolute minimum number of projects is given by $N_{lower}$ (for example, 100). Accordingly, the indicator can be calculated using the following rules:

If $N>N_{upper}$→Green (that is, acceptable and good quality); and

If $N\leq N_{lower}$→Red (that is, unacceptable).

For the cases when N lies in between $N_{upper}$ and $N_{lower}$, at least one embodiment of the invention includes defining a as:

$$\log N=\alpha \log N_{upper}+(1-\alpha)\log N_{lower}.$$

Such an embodiment of the invention can then include using the following rules:

If $\alpha>0.7$; →Green (that is, acceptable);

If $\alpha<0.3$; →Red (that is, unacceptable);

Otherwise; →Yellow (that is, acceptable, but user should proceed with caution).

The results produced by indicators such as detailed above can be presented to a user or trend line generator or project estimator. In an example embodiment of the invention, such results can be displayed to the user using a color coding scheme. Also, as noted, additional indicators and/or metrics can be included and incorporated in one or more embodiments of the invention. By way of example, in determining the applicability of a trend line for a given target project, at least one embodiment of the invention can include using an indicator representing the alignment of the project environment with the trend line, and an indicator representing the alignment of the project execution parameters with the trend line (such as the size of the project).

Also, as noted herein, at least one embodiment of the invention includes defining a set of governance rules associated with the data gathering process, as carried out in connection with an evaluation of the alignment of an estimated project with a trend line. Based on the target project and execution environment for which the estimation is to be carried out, such rules specify the relevance of historical projects to the estimation process. Given a new target project for which an estimate is to be developed, the governance rules can be used to measure the relevance of projects in the available trend lines, thereby identifying the trend line(s) with the most relevant projects and data.

In at least one embodiment of the invention, such governance rules are derived from the characteristics of the estimated project. A rule-based model serves to move questions of the estimation such as sizing, effort, and duration to a filtering process. In at least one embodiment of the invention, the rules can be adjusted and configured by the estimator. Additionally, by using these rules to determine relevant projects from available historical data, the resulting estimation will have more accurate alignment with the target project. Also, project characteristics and project execution can be included as input to generate the trend lines, thereby minimizing intrinsic uncertainty.

Given a trend line and a set of projects which served as the basis for the trend line, the relevance of the trend line to the target project can be determined based on a set of such governance rules. For example, project characteristic rules, in the context of IT development, can include:

1. Matching the size counting method: if project sizing is function point based, historical projects with size measured in function points can be scored as highly relevant.

2. Matching the size: when the project size changes, for example, from 1000 source lines of code (hereafter SLOC) to 10 million SLOC, the productivity can change dramatically. Therefore, historical projects with similar size magnitudes as the target project can be rated as highly relevant.

3. Matching the primary development environment and language: different development environments and languages exhibit different inherent productivity. Therefore, relevant projects can be identified as those with similar primary development environments and languages.

Additionally, by way of example, rules related to the project execution environment can include:

1. Project Duration: if the project schedule is tight with many deadlines for key deliverables, historical projects with similar duration and scheduling constraints can be chosen and/or rated as relevant.

2. Project Resources: if the project uses a globally diverse set of resources, similar historical projects can be chosen and/or rated as relevant. Globally diverse resources imply that some time and effort will likely be devoted to communication between various teams, and this potential source of uncertainty should be incorporated into an estimate.

3. Project Scope: comparing the range of the project covered with the entire life cycle development; such a rule is based on the concept that a project might be separated into multiple parts, and different parts can be completed by different global teams.

In at least one embodiment of the invention, each rule is presented to the estimator or a SME to allow him/her to select whether to apply the rule. Some rules may be mandatory, while others may be optional or discretionary. Also, one or more embodiments of the invention may include skipping or omitting this selection process, in which case default rules can be applied. Once the set of rules to apply is known and/or selected, the relevance of the historical projects in a trend line can be determined, as described below.

Let $p_i$ denote the vector of attributes for the $i^{th}$ project from a set of historical projects P. By way of example, the set P may contain project data from the past five years. Further, denote the $j^{th}$ governance rule as, $b_j(\bullet)$, $j=1, \ldots, M$. Each such rule is an operator which takes as parameters two projects and outputs a numerical value, scoring the level of relevance of the two projects based on their attributes in a particular dimension. Without loss of generality, $b_j(p^*, p_i)\in[0,1]$, with 1 indicating the highest relevance and 0 indicating the lowest relevance. Here, $p^*$ is the target project to be estimated. Example rules can include the following:

1. Rules may be binary: for example, the rule for matching the size counting method:

$$b_j(p^*, p_i) \triangleq \begin{cases} 1 & \text{If project size coming method of } p^* \text{ is same for project } p \\ 0 & \text{Otherwise} \end{cases}$$

2. Rules may be continuous: for example, the rule for matching the project size:

$$b_j(p^*, p_i) \triangleq \frac{1}{K_j}|\text{project\_size}(p^*) - \text{project\_size}(p_i)|,$$

where $K_j$ is a normalization constant. Another example of a continuous rule can include a rule for similarity of the primary language. Such a rule can be defined to assign greater similarity between languages based on input from SMEs.

Once all rules have been evaluated, at least one embodiment includes viewing the quantity, $d_{ij} \triangleq 1-b_j(p^*, p_i)$, as the distance in relevance between project i and the target project based on the $j^{th}$ rule. Considering all rules, at least one embodiment of the invention can additionally define a distance vector, in an M-dimensional space, for each project i. The task of computing the relevance of the target project to all projects which make up the trend line can then be reduced to an operation such as, for example, computing the average squared distance or computing the fraction of projects which lie at a distance greater than some threshold difference. If the distances are larger than some predetermined amount, or if the fraction of projects that are far away from the target project is large (that is, exceeding a predetermined amount), then the relevance of the trend line is low.

Figure 1:
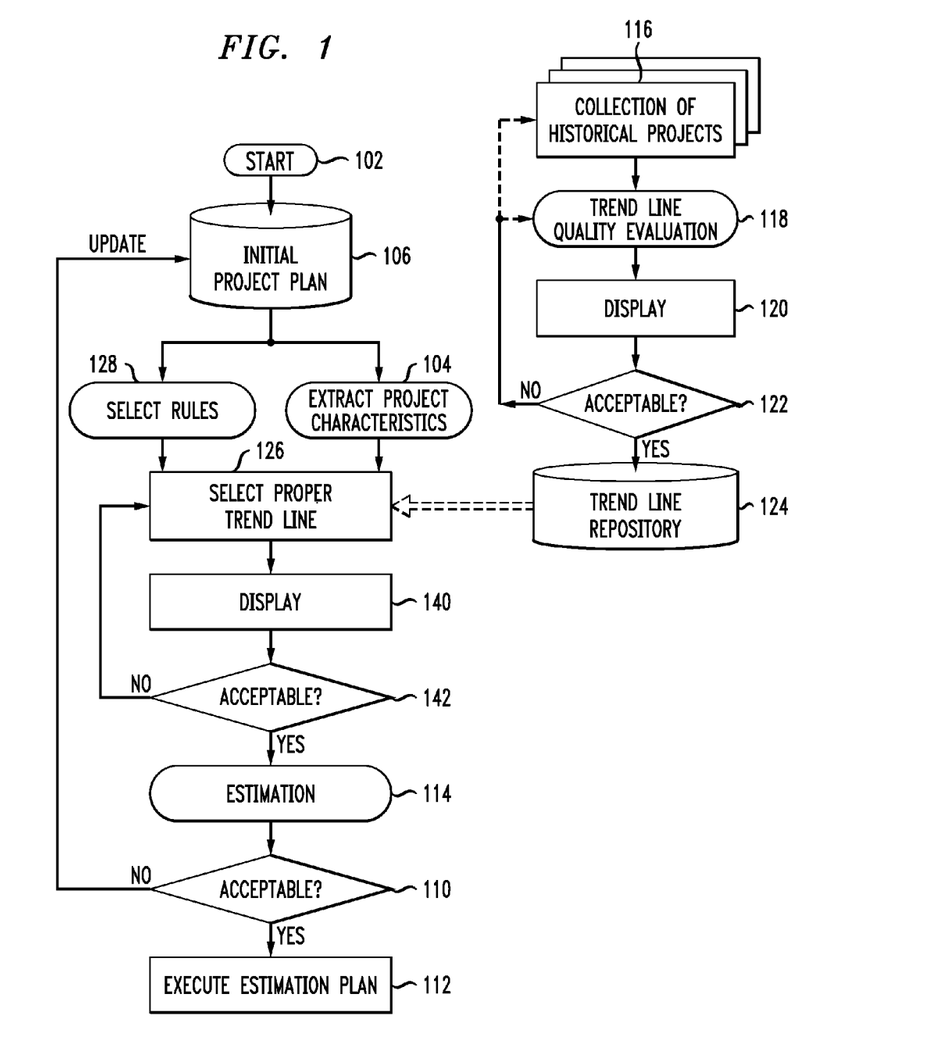
FIG. 1 is a diagram illustrating an example embodiment, according to an embodiment of the present invention.

FIG. 1 is a diagram illustrating an example embodiment, according to an embodiment of the present invention. By way of illustration, FIG. 1 depicts a starting step 102. Subsequently, from an initial project plan database 106, rules are selected in step 128 and project characteristics are extracted in step 104. Also, step 126 includes selecting a proper trend line for the project in question, based on the selected rules and extracted project characteristics, from the trend lines database 124. The selected trend line is displayed in step 140, and in step 142 a determination is made as to whether the selected trend line is acceptable. If the selected trend line is not acceptable, the process reverts back to step 126 and a new trend line is selected. If the selected trend line is acceptable, step 114 includes performing an estimation based on the selected trend line. A determination is made in step 110 as to whether the estimation is acceptable. If no (that is, the estimation is not acceptable), then an updated plan is provided to the initial project plan database 106. If the estimation is acceptable, the estimation plan is executed and output in step 112.

As also depicted in FIG. 1, step 118 includes performing a trend line quality evaluation based on input derived from a collection of historical project data 116. The results of the evaluation are displayed in step 120 (for example, via a color-coding scheme). A determination is made in step 122 whether or not the trend line being evaluated is acceptable. If the trend line quality is deemed acceptable, the trend line is stored in a trend lines database 124. If the trend line quality is not acceptable, additional projects can be collected for collection 116 and/or the collection process can be improved. Additionally, if the trend line quality is not acceptable, one or more quality evaluation metrics used in step 118 can be adjusted.

Figure 2:
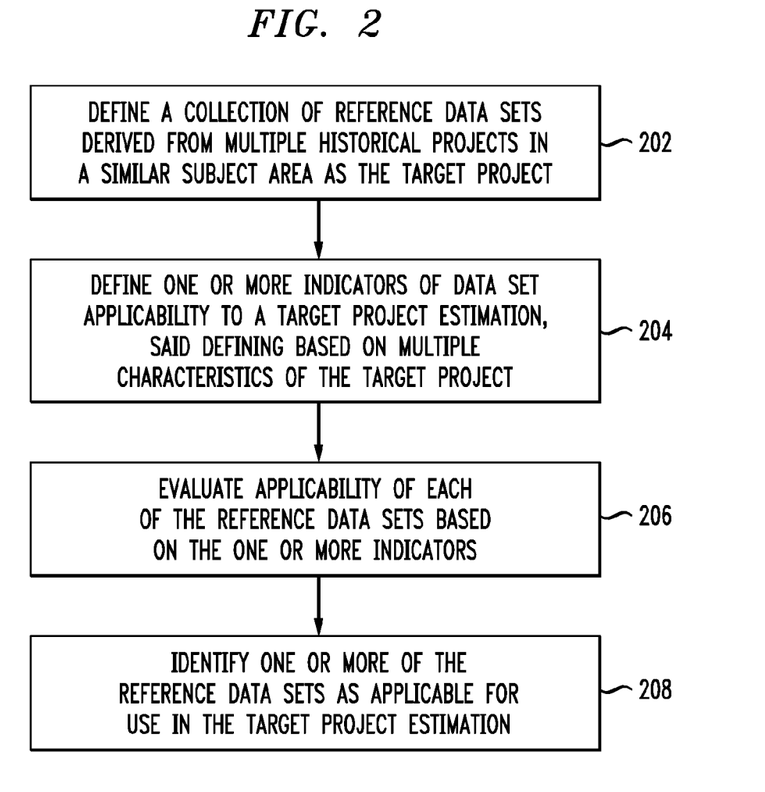
FIG. 2 is a flow diagram illustrating techniques for evaluating applicability of a data set for a given target project estimation, according to an embodiment of the invention.

FIG. 2 is a flow diagram illustrating techniques for evaluating applicability of a data set for a target project estimation, according to an embodiment of the present invention. Step 202 includes defining a collection of reference data sets derived from multiple historical projects in a similar subject area as the target project. Defining the collection of reference data sets can include determining sufficiency for one or more historical projects for inclusion in the collection of reference data sets.

Step 204 includes defining one or more indicators of data set applicability to a target project estimation, said defining based on multiple characteristics of the target project. Defining can include extracting project characteristics from a database, as well as incorporating input from an estimator component and/or a subject matter expert. Such input, additionally, can include information pertaining to one or more aspects of a domain relevant to the target project.

One indicator can represent, for example, coherence of target project environment variables (industry, country, and primary language, etc.) in each of the multiple data sets. Another indicator can represent, for example, a degree of evenness of project size distribution. Additionally, yet another indicator can represent a degree of uncertainty of each of the multiple data sets. Further, another indicator can represent sufficiency of a total number of projects in each of the multiple data sets.

Step 206 includes evaluating applicability of each of the reference data sets based on the one or more indicators. Step 208 includes identifying one or more of the reference data sets as applicable for use in the target project estimation.

The techniques depicted in FIG. 2 can also include defining a metric in connection with the one or more indicators, as well as determining a measure of uncertainty for each of the multiple data sets. Additionally, at least one embodiment of the invention includes displaying the one or more applicable data sets with the one or more corresponding measures of uncertainty to a user. Such a display can also include implementation of a color-coding scheme for depicting the one or more applicable data sets in light of the one or more corresponding measures of uncertainty.

Further, the techniques depicted in FIG. 2 can include storing the data sets identified as applicable for use in the target project estimation in a database, as well as performing the target project estimation based on the one or more data sets identified as applicable. Also, at least one embodiment of the invention includes defining a set of governance rules to be associated with the one or more indicators. Such governance rules can include rules based on characteristics of the target project and rules based on characteristics of an execution environment for which the target project estimation is to be carried out.

As detailed herein, rules based on characteristics of the target project can include, for example, a rule matching a size-counting method, a rule matching project size, and a rule matching development environment and language. Further, rules based on characteristics of the execution environment can include, for example, a rule based on project duration, a rule based on project resources, and a rule based on project scope.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 3:
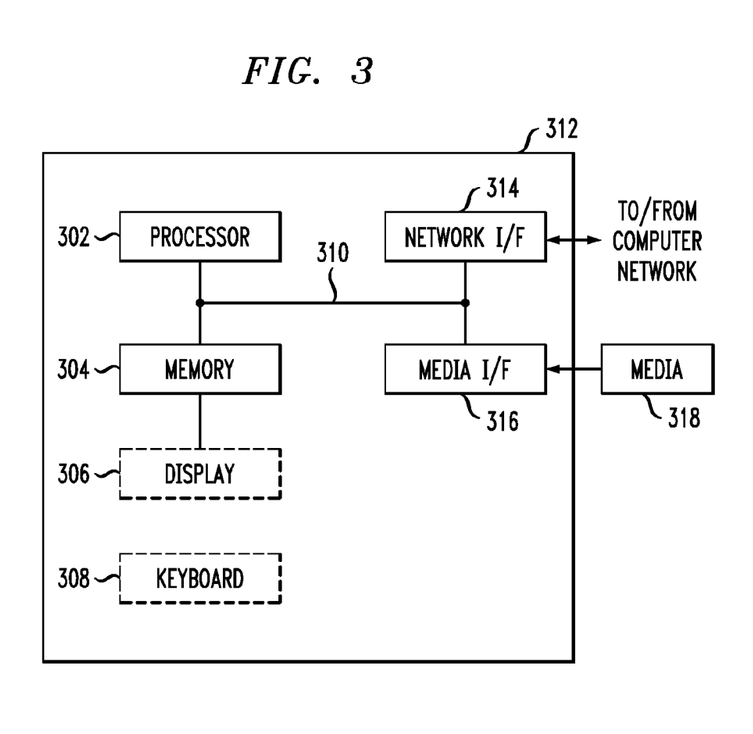
FIG. 3 is a system diagram of an exemplary computer system on which at least one embodiment of the invention can be implemented.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, determination of the quality of a trend line for a selected target data element through a rule-based approach.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described to embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for evaluating applicability of a data set for a target project estimation, the method comprising:
   defining a collection of reference data sets derived from multiple historical projects in a similar subject area as the target project;
   defining multiple indicators of data set applicability to a target project estimation, wherein each of said multiple indicators is based on a characteristic specific to the target project, and wherein the multiple indicators comprise:
      a degree of coherence of target project environment variables across the multiple historical projects;
      a degree of evenness of project size distribution across the multiple historical projects;
      a degree of uncertainty attributed to of each of the reference data sets; and
      a sufficiency of a total number of historical projects in each of the reference data sets determined by comparing a number of historical projects in each reference data set to a threshold number of historical projects;

determining a set of governance rules to be associated with the multiple indicators to determine relevance of historical projects in each of the reference data sets to the target project estimation, wherein said set of governance rules comprises (i) one or more rules derived from characteristics of the target project and (ii) one or more rules based on characteristics of an execution environment for which the target project estimation is to be carried out, wherein said determining comprises:
  establishing a communicative link between a project plan database and a project characteristic extraction module executing on a hardware processor of the computing device;
  extracting multiple characteristics of the target project from the project plan database via the project characteristic extraction module; and
  selecting the set of governance rules from the project plan database based on (i) characteristics of the execution environment for which the target project estimation is to be carried out (ii) the multiple extracted characteristics of the target project, wherein said selecting is carried out by a rule selection module executing on the hardware processor of the computing device and communicatively linked to the project plan database and the project characteristic extraction module;
evaluating applicability of each of the reference data sets to the target project by ill applying the set of governance rules and (ii) determining an alignment of each of the reference data sets to each of the multiple indicators, wherein said evaluating is carried out by an evaluation module executing on the hardware processor of the computing device and communicatively linked to the collection of reference data sets and the rule selection module; and
identifying one or more of the reference data sets as applicable for use in the target project estimation.

2. The method of claim 1, wherein said defining a collection of reference data sets comprises determining sufficiency for one or more historical projects for inclusion in the collection of reference data sets.

3. The method of claim 1, wherein said defining said multiple indicators comprises extracting project characteristics from a database.

4. The method of claim 1, wherein said defining said multiple indicators comprises incorporating input from an estimator component and/or a subject matter expert.

5. The method of claim 4, wherein said input comprises information pertaining to one or more aspects of a domain relevant to the target project.

6. The method of claim 1, comprising:
  defining a metric in connection with the multiple indicators.

7. The method of claim 1, comprising:
  determining a measure of uncertainty for each of the reference data sets.

8. The method of claim 7, comprising:
  displaying the one or more applicable reference data sets with the one or more corresponding measures of uncertainty to a user.

9. The method of claim 8, wherein said displaying comprises implementation of a color-coding scheme for depicting the one or more applicable reference data sets in light of the one or more corresponding measures of uncertainty.

10. The method of claim 1, comprising:
  storing the one or more reference data sets identified as applicable for use in the target project estimation in a database.

11. The method of claim 1, comprising:
  performing the target project estimation based on the one or more reference data sets identified as applicable.

12. The method of claim 1, wherein said target project environment variables comprise one or more of industry, country, and primary language.

13. The method of claim 1, wherein rules based on characteristics of the target project comprise:
  a rule matching a size-counting method;
  a rule matching project size; and
  a rule matching development environment and language.

14. The method of claim 1, wherein rules based on characteristics of the execution environment comprise:
  a rule based on project duration;
  a rule based on project resources; and
  a rule based on project scope.

* * * * *